US009800655B2

United States Patent
Haskins et al.

(10) Patent No.: US 9,800,655 B2
(45) Date of Patent: *Oct. 24, 2017

(54) POLICY AND IDENTITY BASED WORKLOAD PROVISIONING

(71) Applicant: Micro Focus Software Inc., Wilmington, DE (US)

(72) Inventors: Gregory Matthew Haskins, Worcester, MA (US); David H. Bahi, Nashua, NH (US); Daniel Edward Westervelt, Cranford, NJ (US); Jonathan Paul Bultmeyer, Dorchester, MA (US); Stephen R Carter, Spanish Fork, UT (US)

(73) Assignee: Micro Focus Software Inc., Provo, UT (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/336,840

(22) Filed: Jul. 21, 2014

(65) Prior Publication Data

US 2014/0359132 A1 Dec. 4, 2014

Related U.S. Application Data

(63) Continuation of application No. 12/983,382, filed on Jan. 3, 2011, now Pat. No. 8,788,669.

(51) Int. Cl.
*H04L 29/08* (2006.01)
*G06F 9/50* (2006.01)

(52) U.S. Cl.
CPC .......... *H04L 67/1008* (2013.01); *G06F 9/505* (2013.01); *G06F 9/5011* (2013.01); *G06F 2209/503* (2013.01); *G06F 2209/5011* (2013.01)

(58) Field of Classification Search
None
See application file for complete search history.

(56) References Cited

U.S. PATENT DOCUMENTS 6,351,770 B1 * 2/2002 Li ...................... H04L 41/5054
370/259
7,062,642 B1 6/2006 Langrind et al.
(Continued)

FOREIGN PATENT DOCUMENTS

GB 2425694 A 11/2006
WO WO-2005036358 A2 4/2005

OTHER PUBLICATIONS

Demarest, George, et al., "Oracle Cloud Computing", An Oracle White paper, (May 2010), 1-22.
(Continued)

*Primary Examiner* — Farid Homayounmehr
*Assistant Examiner* — Olanrewaju Bucknor
(74) *Attorney, Agent, or Firm* — Schwegman Lundberg & Woessner, P.A.

(57) ABSTRACT

Techniques for policy and identity-based workload provisioning are presented. Identities for requestors or workloads and identities for workloads are tied to specific policies. The specific policies are evaluated based on a stage of readiness for resources within a resource pool and based on resource identities for the resources within the resource pool. Resources are then dynamically provisioned based on the identity-based policy evaluation to handle workloads from the resource pool.

20 Claims, 4 Drawing Sheets

(56) References Cited

U.S. PATENT DOCUMENTS

| | | | |
|---|---|---|---|
| 7,657,887 B2* | 2/2010 | Kothandaraman | H04L 67/06 717/170 |
| 7,747,750 B1* | 6/2010 | Simon | G06F 9/5016 709/226 |
| 7,809,831 B2 | 10/2010 | Matsumitsu et al. | |
| 7,814,364 B2 | 10/2010 | Sankaran et al. | |
| 7,870,568 B2* | 1/2011 | Bernardin | G06Q 10/06 709/202 |
| 8,065,676 B1 | 11/2011 | Sahai et al. | |
| 8,204,981 B1* | 6/2012 | Mishra | H04L 41/5009 709/224 |
| 8,788,669 B2 | 7/2014 | Haskins et al. | |
| 2002/0069235 A1* | 6/2002 | Chen | G06F 9/50 718/104 |
| 2003/0037092 A1 | 2/2003 | Mccarthy et al. | |
| 2003/0050932 A1* | 3/2003 | Pace | G06F 8/60 |
| 2004/0054780 A1 | 3/2004 | Romero et al. | |
| 2005/0102387 A1 | 5/2005 | Herington et al. | |
| 2005/0165925 A1* | 7/2005 | Dan | G06F 9/5083 709/224 |
| 2005/0198244 A1* | 9/2005 | Eilam | G06F 9/5061 709/223 |
| 2006/0075102 A1* | 4/2006 | Cupit | G06Q 10/06 709/225 |
| 2007/0266388 A1* | 11/2007 | Jackson | G06F 9/5027 718/104 |
| 2008/0082546 A1 | 4/2008 | Meijer et al. | |
| 2008/0082983 A1 | 4/2008 | Groetzner et al. | |
| 2008/0104244 A1 | 5/2008 | Chen et al. | |
| 2008/0155100 A1* | 6/2008 | Ahmed | G06F 9/5011 709/226 |
| 2008/0275935 A1* | 11/2008 | Mohindra | H04L 67/16 709/201 |
| 2009/0204960 A1 | 8/2009 | Ben-Yehuda et al. | |
| 2010/0005505 A1 | 1/2010 | Gottimukkala et al. | |
| 2010/0042720 A1 | 2/2010 | Stienhans et al. | |
| 2010/0125473 A1* | 5/2010 | Tung | G06F 9/5072 709/200 |
| 2010/0125855 A1* | 5/2010 | Ferwerda | G06F 9/5027 719/317 |
| 2010/0169477 A1 | 7/2010 | Stienhans et al. | |
| 2010/0185768 A1* | 7/2010 | Hamedany | H04N 21/23116 709/226 |
| 2010/0217841 A1 | 8/2010 | Schneider | |
| 2011/0016214 A1 | 1/2011 | Jackson | |
| 2011/0022812 A1 | 1/2011 | Van Der Linden et al. | |
| 2011/0055707 A1* | 3/2011 | Kimmet | G06F 8/61 715/735 |
| 2011/0125894 A1 | 5/2011 | Anderson et al. | |
| 2011/0131335 A1* | 6/2011 | Spaltro | G06F 9/5072 709/228 |
| 2011/0264805 A1* | 10/2011 | Breitgand | G06F 9/45558 709/226 |
| 2012/0096525 A1 | 4/2012 | Bolgert et al. | |
| 2012/0102193 A1* | 4/2012 | Rathore | G06F 9/06 709/224 |
| 2012/0117626 A1* | 5/2012 | Yates | H04L 63/101 726/4 |
| 2012/0173728 A1 | 7/2012 | Haskins et al. | |

OTHER PUBLICATIONS

Sahai, Akhil, et al., "Automated Policy-Based Resource Constructionin Utility Computing Environments", Hewlett-Packard Laboratories, HPL-2003-176, (Aug. 2003), 1-20.

Turner, Mary Johnston, et al., "Intelligent Workload Management: Oppurtunities and Challenges", IDC Information and Data, (Jun. 2010), 1-11.

Westervelt, Daniel, et al., "", Baracus Users Guide 1.X, http://baracus-project.org/Site/docs/Baracus_UsersGuide_CC_Final.pdf, (No date listed), 31 pgs.

Younge, A. J, et al., "Efficient Resource Management for Cloud Computing Environments", IEEE, ISBN 978-1-4244-7612-1, (Aug. 2010), 357-364.

Zhan, Jianfeng, et al., "PheonixCloud:Provisioning Resources for Heterogeneous Cloud Workloads", (Mar. 2010).

* cited by examiner

POLICY AND IDENTITY BASED WORKLOAD PROVISIONING

PRIORITY APPLICATION

This application is a continuation of U.S. application Ser. No. 12/983,382, filed Jan. 3, 2011, now issued as U.S. Pat. No. 8,788,669, which is incorporated herein by reference in its entirety.

BACKGROUND

Cloud computing is rapidly changing the Internet into a collection of clouds, which provide a variety of computing resources, storage resources, and, in the future, a variety of resources that are currently unimagined. This new level of virtualization has unbounded or should have unbounded the physical and geographical limitations of traditional computing.

However, modern day data centers still have upwards of 80% excess computing and storage capacity reserved for purposes of handling unexpected computing and storage needs of customers/enterprises. That is, even with the advances in cloud computing, the data centers provided to or provided by an enterprise, via a cloud environment or otherwise, still set aside far too much computing and storage assets to account for unexpected demand, which may or may not ever be needed by the enterprise.

In addition, most allocations of computing and storage resources within a data center are governed by agreements between the data center provider and the consuming enterprise (or consuming departments within an enterprise). These agreements are in large part manually configured into the data center assets and are manually monitored and administered.

So, even with the advances of modern day cloud computing, the industry is still employing techniques that prohibit full efficiencies from being completely realized. That is, the enterprises that administer or consume data centers have not yet completely achieved true virtualization where the physical resources that underlie the data center are completely transparent to the enterprises.

SUMMARY

Techniques for policy and identity-based workload provisioning are presented. More particularly, and in an embodiment, a method for policy and identity-based workload provisioning is described.

Specifically, a resource infrastructure is interrogated to acquire resource identities for resources within the resource infrastructure and to determine a stage of readiness for each resource within the resource infrastructure. Next, policy specifications are managed; the policy specifications are assigned to workload identities for workloads and are assigned to requestor identities for requestors of the workloads. Finally, the resources are provisioned for handling the workloads based on: requests from the requestors, the stage of readiness for each of the resources, enforcement of the policy specifications, and the resource identities within the resource infrastructure.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "workload" as used herein refers to a special type of resource, such as a Virtual Machine (VM), an Operating System (OS), a cloud, a hardware device, an agent, and/or an application.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented, programmed, and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
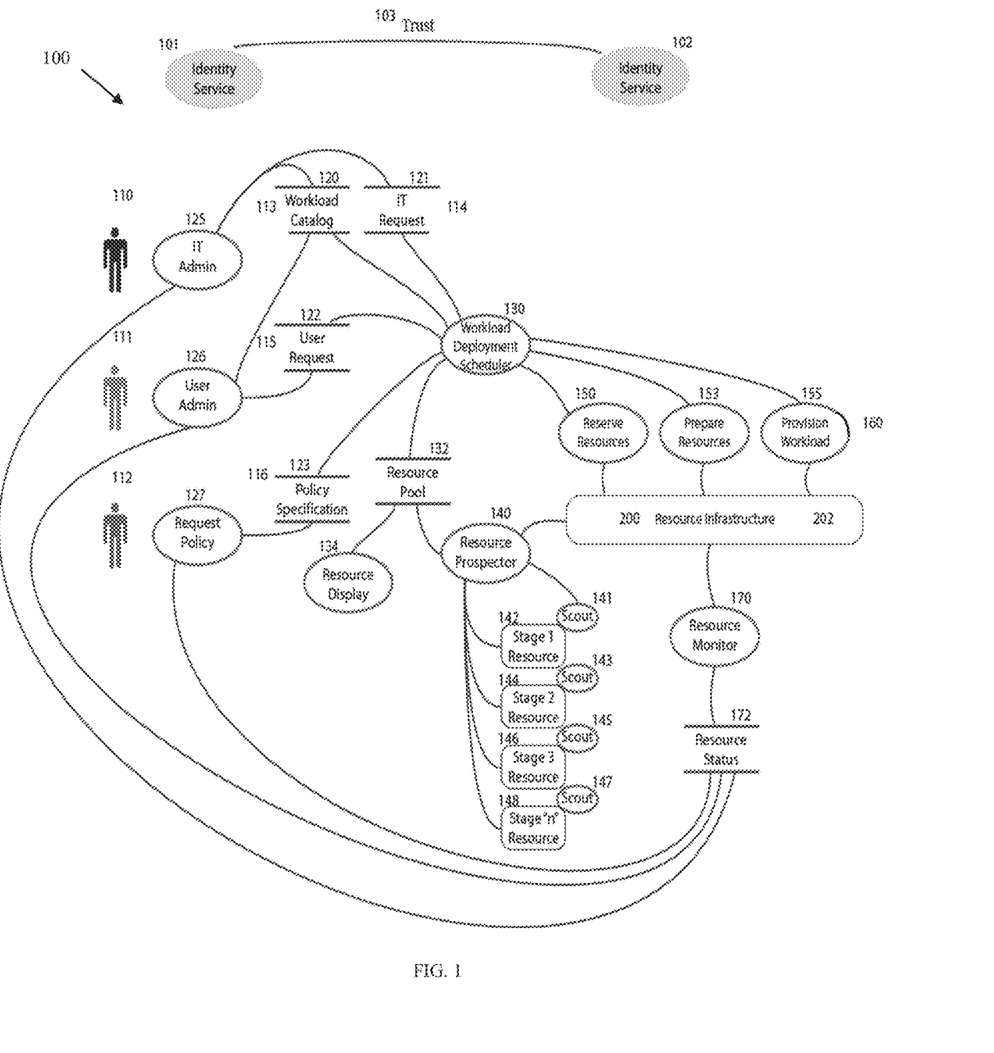
FIG. 1 is a diagram depicting policy and identity-based workload provisioning, according to an example embodiment.

FIG. 1 is a diagram depicting policy and identity-based workload provisioning, according to an example embodiment. The components of the FIG. 1 are implemented in a machine-accessible and non-transitory computer-readable medium as instructions that execute on one or more processors (machines, computers, processors, etc.). The machines are specifically configured to process each of the components. Furthermore, the components are operational over and processes within one or more networks. The network(s) may be wired, wireless, or a combination of wired and wireless.

Various embodiments of the techniques proposed herein and below utilize an Identity Service. For example, Identity Services 101 and 102 can be used along with an associated Trust Specification 103. While just two Identity Services (101 and 102) and one Trust Specification 103 are shown, it is to be understood that some "n" Identity Services can be connected by some "m" Trust Specifications in such a way as to produce a web of Identity Services connected by Trust Specifications that produce mechanisms for an identity created, at 101, to be trusted in some manner, at 102 for example. There may also be Identity Services that are not connected via Trust Specification 103, which thusly have no specific Trust Specification to govern a trust of identity between the two Identity Services (101 and 102).

Therefore, the invention utilizes several (two shown in the FIG. 1) Identity Services (101 and 102) that have a Trust Specification 103 so that the identities (e.g., 110, 111, 112, 113, 114, 115, 116, 160, 202) may be used in a manner, where the specifications within the identities can be trusted in some manner (e.g., roles specified by 101 can map to roles in 102, which are individually governed by policy).

The technique presented provides for a user/agent to utilize an Information Technology (IT) Admin process 125 after obtaining an identity 110 that specifies the rights, permissions, roles, etc., which the IT Admin 125 is allowed to act within; likewise, User Admin 126 and the associated identity at 111 and Request Policy 127 and associated identity at 112.

The administrator/agent obtains an identity 112 by providing appropriate credentials at 101 and utilizes the Request Policy 127 to author the Policy Specification 123. In an embodiment, Policy Specifications 123 are individually associated with an identity 116, which are derived from the rights and permissions/roles specified in 127. Each such 123, with the associated 116, provides any further use of the Policy Specification 123 with a secure statement of rights and permissions/roles that the policy specification can act within and/or other mechanisms which their own identity can use. Thus, if a mechanism tries to use a Policy Specification whose identity 116 is not allowed by the mechanism, then the mechanism may be denied the use of such. So, 127 uses 112 to specify 123 with associated 116, such that policy is defined for the operation of the techniques presented herein.

The administrator/agent obtains an identity 111 by providing appropriate credentials at 101 and utilizes the User Admin 126 to author User Request 122. In an embodiment, User Requests 122 are individually associated with an identity 115, which are derived from the rights and permissions/roles specified in 126. Each such 122, with the associated 115, provides any further use of the User Requests 122 with a secure statement of rights and permissions/roles that the User Request 122 can act within and/or other mechanisms which their own identity can use. Thus, if a mechanism tries to use a User Request 122 whose identity 115 is not allowed by the mechanism, then the mechanism may be denied the use of such. So, 126 uses 111 to specify 122, with associated 115, such that a User Request 122 is defined for the operation of the techniques presented herein.

The administrator/agent using 125, 110, 121, and 114 functions in the same manner as described above. In addition to this functionality, the administrator 125 can define a Workload Catalog 120 with an associated identity 113, such that workloads can be selected from the catalog by other mechanisms within the invention and the corresponding identity 113 interrogated by the other mechanisms to make sure that the appropriate policies are being applied in terms of access control and utilization.

The techniques presented herein also provide for a Resource Prospector 142 to interrogate each of the resources defined or present within the Resource Infrastructure 200 by: 1) performing a hardware search; 2) interrogating resources at a known Stage; and/or 3) discovering new hardware that has been made available in the Resource Infrastructure 200 (e.g., a new blade being placed within a rack or a new blade replacing a defective blade within a rack).

The techniques presented herein define the Stage as being the readiness of resource within the Resource Infrastructure 200 in preparation for utilization by the techniques. For example, Stage 1 Resource 142 may be a new blade that has been made available and that is not formatted in any way to be used by a hypervisor or operating system (OS) and is discovered because the hardware either makes its presence known through some kind of hardware interaction or is discovered on power up because of a Basic Input/Output System (BIOS) function within the startup mechanism of the hardware. The presence of new hardware may also be discovered as a result of a Pre-Boot Execution Environment (PXE) interaction at hardware start up or any number of other discovery mechanisms. In this case, a Stage 1 Resource 142 has a special kind of Scout 141 deployed that is capable of interrogating the hardware without the interaction of an OS or hypervisor. A Stage 2 Resource 144 has a Scout 143, associated with it, which is capable of interacting with the level of functionality that the hardware has (e.g., the hardware blade with a hypervisor deployed but no guest OS's). Similar stages of deployment can be defined for Stage 3 Resource at 146 and Stage "n" Resource at 148 with their associated Scouts at 145 and 147, respectively.

In each case, the Scout (141, 143, 145, or 147) is able to interrogate the resources available from each entity within the Resource Infrastructure 200 so that a Resource Pool 132 can be maintained which, in relation to the operation of the Resource Prospector 140, is accurate. In an embodiment, a Resource Display 134 is provided to allow the visualization of resources in the Resource Infrastructure 200 as those resources are discovered and defined by the Resource Prospector 140.

With Workload Catalog 120, IT Request 121, User Request 122, and Policy Specification 123 along with their respective identities at 113, 114, 115, 116 defined and the availability of a Resource Pool 132, the techniques presented herein provide for a Workload Deployment Scheduler 130 that utilizes this information to perform several functions, such as: 1) Reserve Resources 150 by annotating the resources in Resource Infrastructure 200 in such a way that the resources are reserved for specific use—this may also be performed by modifying the Resource Pool 132 (not shown in the FIG. 1) 2) rather than actually annotating the hardware resources in the Resource Infrastructure 200; 3) Prepare Resources 153 instantiated by 132 to prepare certain resources in Resource Infrastructure 200, such that the resources at the particular Stage, which is needed by the workload to be deployed—for example, the resource may be completely unformatted and the function at 153 deploys a hypervisor on the resource in preparation for the deployment of a guest OS workload; and/or 4) Provision Workload 155 utilizes information provided by 130 from 120, 121, 122, and 123, with their associated identities at 113, 114, 115, 116, such that a workload can be provisioned to one or more resources in the Resource Infrastructure 200.

It is well to note that in an embodiment a unique identity may be constructed by 130 so that the workload has the identity at 160 associated with it, which thereby provides a mechanism for tracking identity through the Resource Infrastructure 200. In an embodiment, if the Resource Infrastructure 200 also has an identity (or identities for different "zones" of the infrastructure) 202 then additional policy dereferencing can be performed as the workload is provisioned by 115 by verifying the policies governing the deployment of workloads with associated identity at 160, within the particular areas of the Resource Infrastructure 200 given a unique identity at 202. In an embodiment, the Workload Deployment Scheduler 130 matches resources in the Resource Infrastructure 200 at their current Stage readiness through the Resource Pool 132 to minimize the amount of time utilized by the Prepare Resources 153.

The techniques presented also provide for a Resource Monitor 170, which provides for the monitoring of Resource Infrastructure 200 together with associated identities so that the actual functioning of the Resource Infrastructure 200 can be monitored and reported in a Resource Status 172. The Resource Status 172 is also available to 125, 126, and 127 to assist the administrator/agent and the preparation of the configurations contained within 120, 122, and 123.

It is to be noted that the techniques presented herein are not restricted to a single network or cloud, but rather may be interoperable via many networks and/or many clouds.

Figure 2:
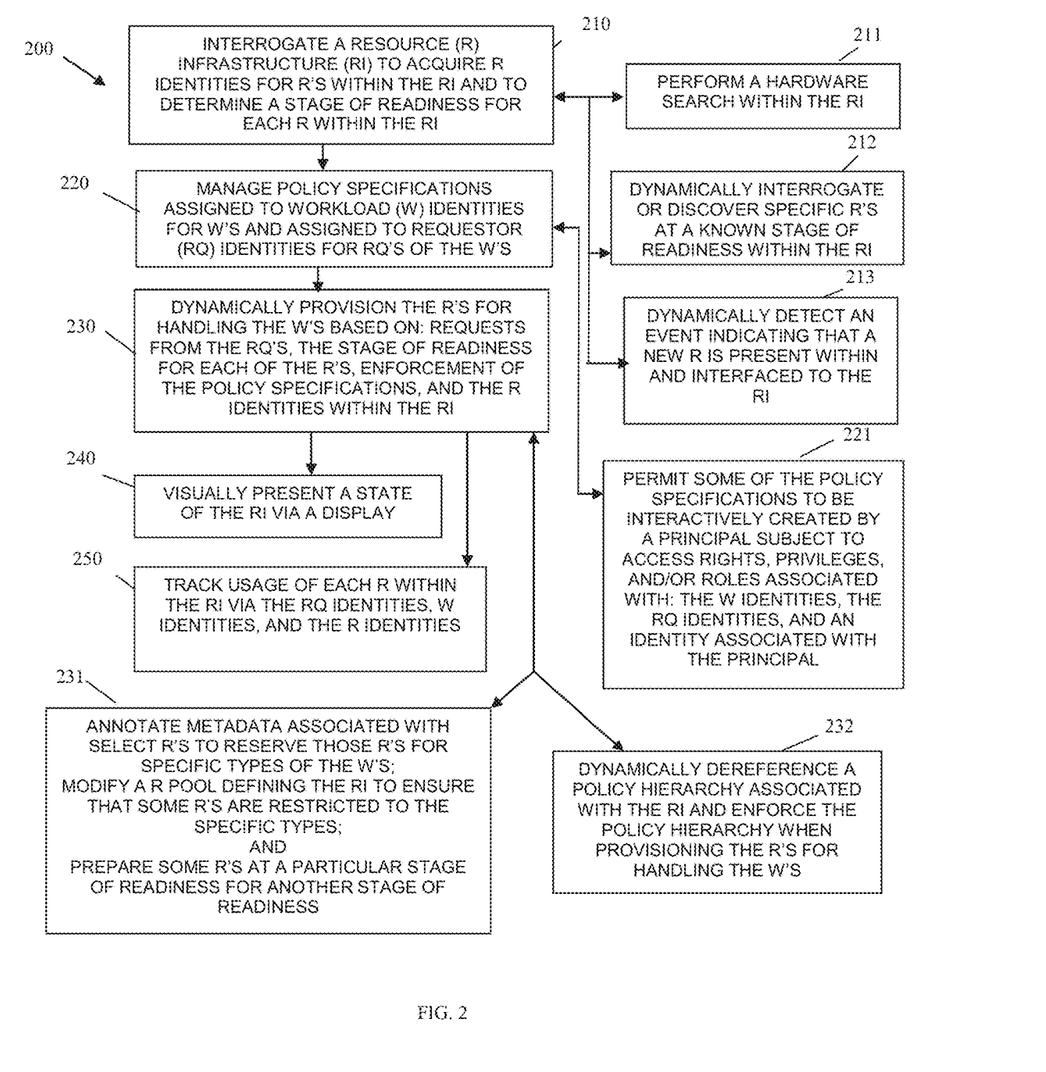
FIG. 2 is a diagram of a method for policy and identity-based workload provisioning, according to an example embodiment.

FIG. 2 is a diagram of a method 200 for policy and identity-based workload provisioning, according to an example embodiment. The method 200 (hereinafter "cloud provisioning service") is implemented in a machine-accessible and non-transitory computer-readable medium as instructions that execute on one or more processors (machines, computers, processors, etc.). The machine is specifically configured and programmed to process the cloud provisioning service. Furthermore, the cloud provisioning service is operational over and processes within one or more networks. The network(s) may be wired, wireless, or a combination of wired and wireless.

At 210, the cloud provisioning service interrogates a resource infrastructure to acquire resource identities for resources within the resource infrastructure and to determine a stage of readiness for each resource within the resource infrastructure. It is noted that the resource identities may be specific to the resource infrastructure. It is also noted that the resource infrastructure can itself be a cloud processing environment. That is, the resource infrastructure can be logically configured as a resource infrastructure. Although it is also noted that in some embodiments, the resource infrastructure belongs to a same physical processing environment or same network environment.

According to an embodiment, at 211, the cloud provisioning service performs a hardware search within the resource infrastructure for purposes of identifying the resources available within the resource infrastructure.

In another case, at 212, the cloud provisioning service dynamically interrogates specific resources at a known stage of readiness within the resource infrastructure. Here, each stage of readiness for resources are polled or interrogated by the cloud provisioning service to determine availability within specific stages of readiness of the infrastructure.

In yet another situation, at 213, the cloud provisioning service dynamically detects an event indicating that a new resource is present within and interfaced to the resource infrastructure. Here, the infrastructure detects the presence of a newly added resource that is communicating or interfaced with the infrastructure and an event is raised which is detected by the cloud provisioning service. Events can occur during boot up of the resource infrastructure or dynamically as resources are interfaced to the infrastructure.

At 220, the cloud provisioning service manages policy specifications assigned to workload identities for workloads and assigned to requestor identities for requestors that desire or request the workloads. That is, policies are defined via policy specifications based on identities of requestors and workloads (work or tasks that are to be processed within the resource infrastructure). It is also noted, that in some instances the requestor can be an automated service and in other instances the requestor is a user or administrator.

In an embodiment, at 221, the cloud provisioning service permits some of the policy specifications to be interactively created by a principal (administrator, user, or automated program) subject to access rights, privileges, and/or roles assigned to an identity of the principal, workload identities for the workloads, and/or requestor identities for the requestor. The policy specifications may also include identities that are managed and subject to certain policy constraints.

At 230, the cloud provisioning service dynamically provisions the resources for handling (processing) the workloads based on: requests made from the requestors, that stage of readiness for each of the resources, enforcement of the policy specifications, and the resource identities for the resources within the resource infrastructure. So, policy and identity-based constraints are enforced to dynamically provision a workload for processing by a resource that can handle the workload within the resource infrastructure.

In an embodiment, at 231, the cloud provisioning service can perform a variety of processing in advance of or in connection with the dynamically provisioning of the resource for handling the workload. For example, the cloud provisioning service can annotate metadata associated with select resources to reserve those resources for specific types of workloads or for specific usage. In another case, the cloud provisioning service can modify an available pool of resources that defines the resource infrastructure to ensure that some resources are restrict to the specific types of workloads or the specific usage. In yet other scenario, the cloud provisioning service prepares some resources at a particular stage or readiness for another stage of readiness. So, in this latter case a workload may need a particular hypervisor installed for a workload and it is not in that stage or readiness; in such a situation, the cloud provisioning service can prepare the resource in advance by instantiating and configuring the hypervisor on the resource so as to change its stage or readiness to one that is acceptable for handling the workload.

In another case, at 232, the cloud provisioning service dynamically dereferences a policy hierarchy associated with the resource infrastructure and dynamically enforces the policy hierarchy when provisioning the resources for handling the workloads. Here, the resource infrastructure can include its own identity that is tied to the policy hierarchy.

According to an embodiment, at 240, the cloud provisioning service visually presents a state of the resource infrastructure via a display based on allocation of the various resources, identities using the resources, and/or stages of readiness for each of the resources. It may also be that that views of multiple different resource infrastructures can be superimposed on one another in a single visual display for comparison or multiple resource infrastructures.

In another case, at 250, the cloud provisioning service tracks usage of each resource within the resource infrastructure via the requestor identities, workload identities, and/or the resource identities. So, usage tracking and monitoring can be achieved based on identities.

Figure 3:
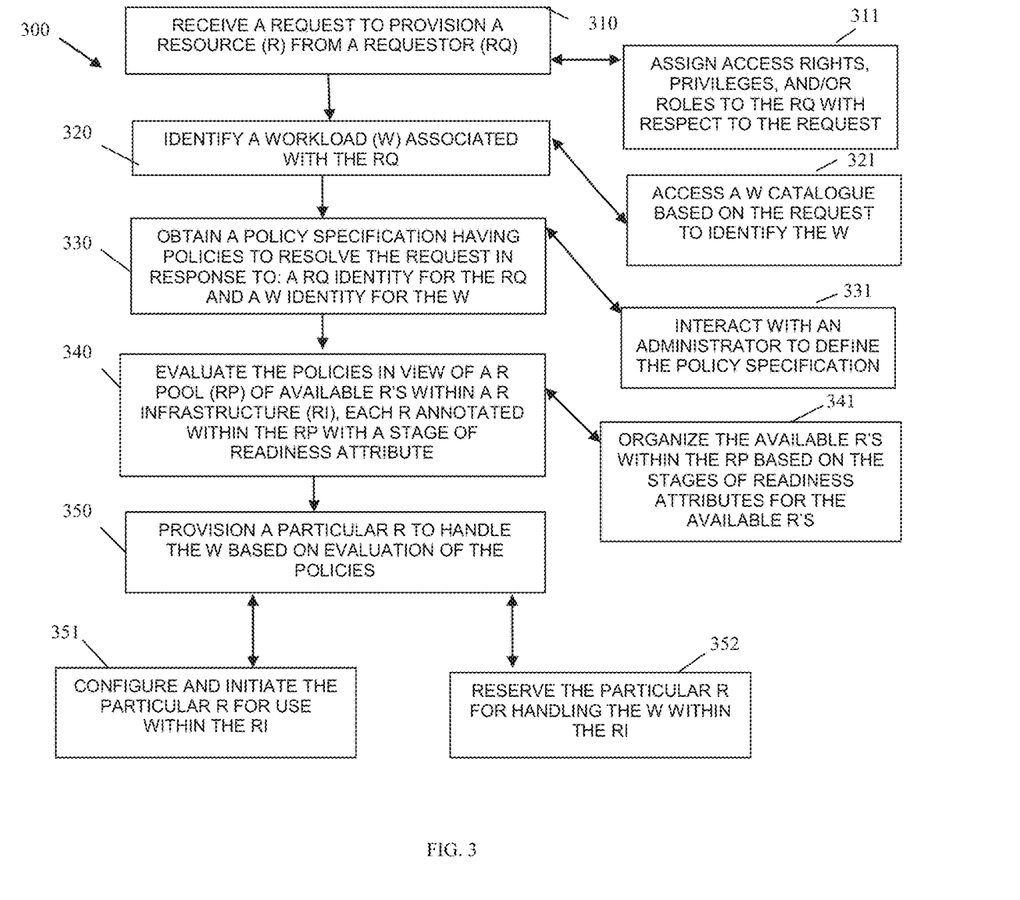
FIG. 3 is a diagram of another method for policy and identity-based workload provisioning, according to an example embodiment.

FIG. 3 is a diagram of another method 300 for policy and identity-based workload provisioning, according to an example embodiment. The method 300 (hereinafter "provisioning service") is implemented in a machine-accessible and non-transitory computer-readable medium as instructions that execute on one or more processors (machines, computers, processors, etc.). The machine is specifically configured and programmed to process the provisioning service. Furthermore, the provisioning service is operational over and processes within one or more networks. The network(s) may be wired, wireless, or a combination of wired and wireless.

The provisioning service presents another and in some ways enhanced perspective of the cloud provisioning service represented by the method 200 of the FIG. 2.

At 310, the provisioning service receives a request to provision a resource from a requestor. The initial infrastructure that the provisioning service works within was discussed in detail above with reference to the FIGS. 1 and 2, respectively.

According to an embodiment, at 311, the provisioning service assigns access rights, privileges, and/or roles to the requestor with respect to the request. These access rights, privileges, and/or roles dictate how the request is processed and which resources are provided to handle a workload associated with the request.

At 320, the provisioning service identifies a workload associated with the request. The workload is one or more tasks that are to be performed via one or more resources that the provisioning service designates and configures for handling the tasks. The request may or may not directly identify the workload. That is, a type of task or description of the task can be used to derive the workload.

As another example, at 321, the provisioning service accesses a workload catalogue based on attributes or information in the request to identify the workload.

At 330, the provisioning service obtains a policy specification having policies to resolve the request in response to: a requestor identity for the requestor and a workload identity for the workload. The policy specification and policies are identity driven.

According to an embodiment, at 331, the provisioning service interacts with an administrator to define the policy specification. This interaction and interplay was described in detail above with reference to the FIG. 1.

At 340, the provisioning service evaluates the policies in view of a resource pool of available resources within a resource infrastructure. Each resource is annotated within the resource pool with a stage of readiness attribute.

In an embodiment, at 341, the provisioning service organizes the available resources within the resource pool based on the stages of readiness attributes for the available resources. So, resources needing configured and/or formatted before full use is available are grouped together.

At 350, the provisioning service provisions a particular resource to handle the workload based on evaluation of the policies. This can entail a variety of additional operations as well.

For example, at 351, the provisioning service may configure and initiate the particular resource for use within the resource infrastructure in advance of the resource being provisioned to handle the workload.

In another case, at 352, the provisioning service reserves the particular resource for handling the workload within the resource infrastructure. That is, the particular resource can be reserved or specifically designated for handling the workload. This ensures a certain degree of quality of service for the workload.

Figure 4:
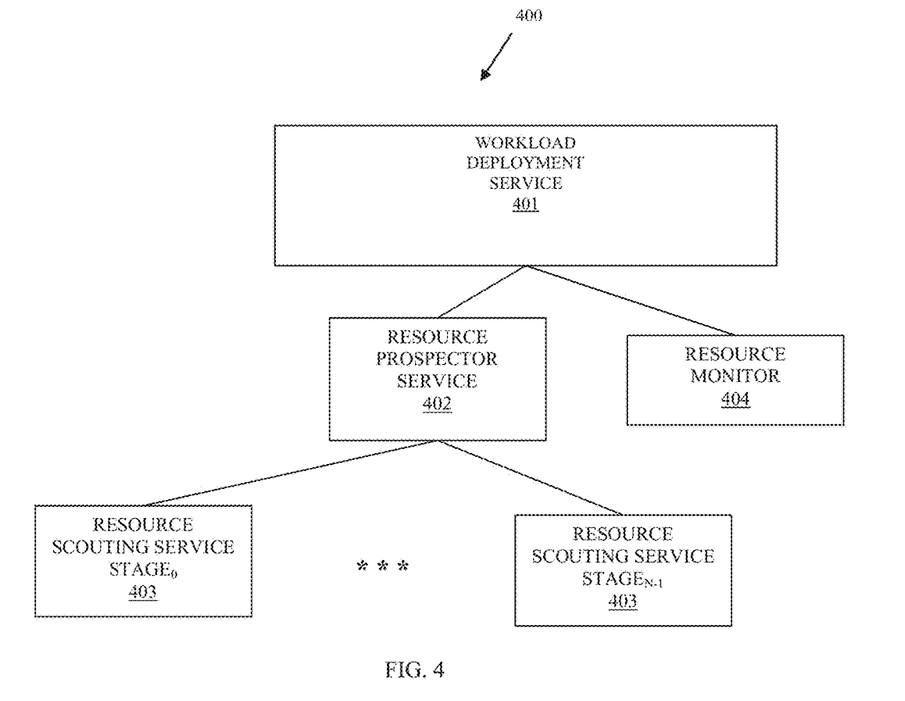
FIG. 4 is a diagram of a policy and identity-based workload provisioning system, according to an example embodiment.

FIG. 4 is a diagram of a policy and identity-based workload provisioning system 400, according to an example embodiment. The policy and identity-based workload provisioning system 400 is implemented in a machine-accessible and non-transitory computer-readable medium as instructions that execute on multiple processors (machines, computers, processors, etc.). The machines are specifically configured to process the policy and identity-based workload provisioning system 400. Furthermore, the policy and identity-based workload provisioning system 400 is operational over and processes within one or more networks. The network(s) may be wired, wireless, or a combination of wired and wireless.

In an embodiment, the policy and identity-based workload provisioning system 400 implements, inter alia, the methods 200 and 300 of the FIGS. 2 and 3, respectively.

The policy and identity-based workload provisioning system 400 includes a workload deployment service 401, a resource prospector service 402, and a plurality of resource scouting services 403. In an embodiment, the policy and identity-based workload provisioning system 400 also includes a resource monitor 404. Each of these components and their interactions with one another will now be described below in turn.

The workload deployment service 401 is configured to execute on one or more processors. The workload deployment service 401 is programmed within a non-transitory computer-readable storage medium as instructions that the one or more processors are specifically configured to execute. Example features of the workload deployment service 401 were presented in detail above with respect to the FIGS. 1-3.

The workload deployment service 401 is configured to dynamically provision resources within a resource infrastructure for purposes of handling or processing workloads. Provisioning occurs based on policies and identities, which are associated with requestors, the workloads, and the resources.

According to an embodiment, the workload deployment service 401 is configured to schedule a particular resource for handling a particular workload on a particular policy.

In another scenario, the workload deployment service 401 is configured to: reserve particular resources for particular types of workloads, prepare the particular resources in advance of handling particular workloads, and/or authorize the particular resources to handle particular workloads.

The workload deployment service 401 interacts with resource prospector service 402 and the resource scouting services 403.

The resource prospector service 402 is configured to execute on the one or more processors. The resource prospector service 402 is programmed within a non-transitory computer-readable storage medium and the one or more processors are specifically configured to execute the resource prospector service 402. Example aspects of the resource prospector service 402 were presented above with reference to the FIGS. 1-3.

The resource prospector service 402 is configured to interrogate the resource infrastructure to identify the resources and a stage of readiness associated with each of the resources. Each stage or readiness for a particular resource including a particular scouting service 403. Moreover the resource prospector service 402 and/or the scouting services 403 annotate particular states of readiness for each resource within a resource pool associated with the resource infrastructure.

Each scouting service 403 is configured to execute on the one or more processors. Moreover, each scouting service 403 is programmed within a non-transitory computer-readable storage medium and the one or more processors are specifically configured to execute each scouting service 403. Aspects of the scouting service were presented above with reference to the FIGS. 1-3.

Each scouting service 403 is configured to communicate with a particular resource in that particular resource's stage of readiness. Each scouting service 403 communicates with the resource prospector service 402 and the resource prospector service 402 communicates with the workload deployment service 401 for purposes of dynamically provisioning the resources.

In an embodiment, the policy and identity-based workload provisioning system 400 also includes a resource monitor 404. The resource monitor 404 is configured to process on the one or more processors. Additionally, the resource monitor 404 is programmed within a non-transitory computer-readable storage medium and the one or more processors are specifically configured to execute the resource monitor 404.

The resource monitor 404 is configured to monitor the resource infrastructure and report status of the resources individually, in groups, and/or as a whole for the entire resource infrastructure.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
    interrogating, by a computer, a resource infrastructure to acquire for resource identities associated with resources within the resource infrastructure and to determine a stage of readiness for each resource within the resource infrastructure, wherein the resource infrastructure is a hardware and software infrastructure and the resources are hardware and software resources; and
    managing policy specifications assigned to workload identities for workloads and assigned to requestor identities for requestors of the workloads, and each workload identity and each requester identity formulated from that identity's one or more identifiers and secrets that provide a statement of roles and permissions; and
    provisioning, by the computer, the resources for access within the workloads based on requests from requestors and enforcement of policy specifications and identity-based constraints, wherein each workload identity and requestor identity for each requestor are formulated with a statement of roles and permissions for each identity relative to the resource identities, and wherein each workload is one of: a Virtual Machine (VM), an Operating System (OS), a cloud computing environment, a hardware device, a software agent, and a software application, wherein provisioning further includes reserving, by a workload scheduler processing on the computer, the resources by annotating metadata of each resource for a specific use and annotating each resource with a the stage of readiness and instantiate a hypervisor of the resource infrastructure to change the stage of readiness within an acceptable threshold to handle the workload.

2. The method of claim 1 further comprising, managing, by the computer, the policy specification that are assigned to the requestor identities and the workload identities.

3. The method of claim 1 further comprising, presenting, by the computer, a visual presentation of a state of the resource infrastructure on a display.

4. The method of claim 1 further comprising, tracking, the computer, the resource identities, the workload identities, and the requestor identities active within the resource infrastructure.

5. The method of claim 4, wherein tracking further includes recording resource usage for each resource within the resource infrastructure using the resource identities, the workload identities, and the requestor identities.

6. The method of claim 1, wherein interrogating further includes interrogating each resource by performing a hardware search to discover hardware resources present within the resource infrastructure.

7. The method of claim 6, wherein interrogating further includes interrogating each resource to determine the stage of readiness for that resource.

8. The method of claim 7, wherein interrogating further includes discovering new hardware recently made available within the resource infrastructure.

9. The method of claim 6, wherein interrogating further includes interrogating at least some of the hardware resources without interacting with an operating system associated with the hardware resources.

10. The method of claim 1, wherein interrogating further includes determining a state of readiness for each resource and an overall state for the resource infrastructure.

11. A method, comprising:
    identifying, by a computer, a workload having a type of resource requested by a requestor to be provisioned, wherein the type of resource is a hardware or software resource;
    obtaining, by the computer, an identity-based policy specification to handle provisioning of a resource within the workload, the resource of the type requested by the requestor;
    evaluating, by the computer, the identity-based policy specification based on a requestor identity for the requestor and a workload identity for the workload, and wherein each identity is formulated from one or more identifiers and secrets that provide a state of roles and permissions for which that identity has in relation to available resources of the type requested by the requestor wherein the workload is one of: a Virtual Machine (VM), an Operating System (OS), a cloud computing environment, a hardware device, a software agent, and a software application, and
    dynamically provisioning, by the computer, a resource based on the evaluation of the identity-based policy specification, wherein dynamically provisioning further includes reserving, by a workload scheduler processing on the computer, the resource by annotating metadata of the resource for a specific use and annotating the resource with a the stage of readiness and instantiate a hypervisor of the resource infrastructure to change the stage of readiness within an acceptable threshold to handle the workload.

12. The method of claim 11, wherein evaluating further includes organizing the available resources of the type requested by the requestor within a pool of resources based on states of readiness for each of the available resources.

13. The method of claim 11, wherein dynamically provisioning further includes reserving the resource within a resource infrastructure to handle the workload.

14. The method of claim 13, wherein reserving further includes configuring the resource for deployment within the resource infrastructure.

15. The method of claim 14, wherein configuring further includes assigning access rights to the requestor with respect to the configured resource and the workload.

16. The method of claim 15, wherein configuring further includes initiating the configured resource within the resource infrastructure to handle the workload on behalf of the requestor.

17. A system, comprising:
a resource infrastructure having a plurality of hardware and software resources;
one or more processors of one or more hardware resources managing policy specifications assigned to workload identities for workloads and assigned to requestor identities for requestors of the workloads, and each workload identity and each requester identity formulated from that identity's one or more identifiers and secrets that provide a statement of roles and permissions; and
a provisioning service configured and adapted to: i) execute on the one or more processors the hardware resources and ii) provision at least some of the resources to handle workloads based on identities associated with requestors, the workloads, and the resources, each identity formulated from that identity's one or more identifiers and secrets that provide a statement of roles and permissions for which that identity has in relation to the resource, and wherein each workload is one of: a Virtual Machine (VM), an Operating System (OS), a cloud computing environment, a hardware device, a software agent, and a software application, and wherein reserving the at least some of the resources by annotating, by a workload scheduler portion of the provisioning service, metadata of each resource for a specific use and annotating each resource with a the stage of readiness and instantiate a hypervisor of the resource infrastructure to change the stage of readiness within an acceptable threshold to handle the workload.

18. The system of claim 17 further comprising, a prospector service configured and adapted to: i) execute on one or more processors associated with one or more of the hardware resources, ii) interrogate the resource infrastructure to discover the resource identities for the resources and identify the stage of readiness for each of the resources, and iii) interact with the provisioning service to provide the resource identities and the states of readiness.

19. The system of claim 17 further comprising, a workload deployment service configured and adapted to: execute on one or more processors associated with one or more of the hardware resources, ii) configure the resources that are being provisioned by the provisioning service, and iii) initiate the configured resources within the resource infrastructure to handle the workloads.

20. The system of claim 19, wherein the workload deployment service is further configured and adapted to: iv) scheduling at least one configured resource for handling a particular workload based on a policy before initiating within the resource infrastructure.

* * * * *

UNITED STATES PATENT AND TRADEMARK OFFICE
CERTIFICATE OF CORRECTION

| | |
|---|---|
| PATENT NO. | : 9,800,655 B2 |
| APPLICATION NO. | : 14/336840 |
| DATED | : October 24, 2017 |
| INVENTOR(S) | : Haskins et al. |

It is certified that error appears in the above-identified patent and that said Letters Patent is hereby corrected as shown below:

On the Title Page

On page 2, in Column 2, under "Other Publications", Line 2, delete "Constructionin" and insert --Construction in-- therefor On page 2, in Column 2, under "Other Publications", Line 5, delete "Oppurtunities" and insert --Opportunities-- therefor In the Claims In Column 9, Line 67, in Claim 1, after "with", delete "a"

In Column 10, Line 62, in Claim 11, after "with", delete "a"

In Column 12, Line 9, in Claim 17, after "with", delete "a"

In Column 12, Line 22, in Claim 19, after "to:", insert --i)--

Signed and Sealed this
Twenty-first Day of April, 2020

Andrei Iancu
*Director of the United States Patent and Trademark Office*